Sept. 5, 1950      W. R. WILEY      2,521,271

RESILIENT SHEET METAL FASTENING CLIP

Filed March 16, 1948

INVENTOR.
William R. Wiley.
BY
Harness, Dickey & Pierce.
ATTORNEYS.

Patented Sept. 5, 1950

2,521,271

UNITED STATES PATENT OFFICE 2,521,271

RESILIENT SHEET METAL FASTENING CLIP

William R. Wiley, Phoenix, Ariz.

Application March 16, 1948, Serial No. 15,106

2 Claims. (Cl. 24—113)

The present invention relates to fastening clip devices for securing desired objects to relatively thin supporting panels of sheet metal or the like, having for its principal object the provision of an improved type of spring clip fastener adapted to be quickly applied to and effectively held in position upon the apertured portion of a supporting panel, or the like, and to furnish an anchor or holding device for securing thereto objects to be supported, such as decorative and protective moldings. It will be understood that the indicated uses are illustrative, and that improved spring clips constructed in accordance with my present invention are readily applicable to a wide variety of other fastening purposes.

It is an object of the present invention to provide a clip of the spring type which is so designed as to effectively cover the opening in the supporting body in which the clip is inserted, to thereby prevent passage of water or foreign matter through the opening.

Another object is to provide such an improved spring clip device which may be economically formed of a single piece of spring metal, and which is inexpensive and simple to use.

Other objects and advantages will become apparent upon consideration of the present disclosure in its entirety.

In the drawings,

Figure 6 is an end elevational view.

Figure 1:
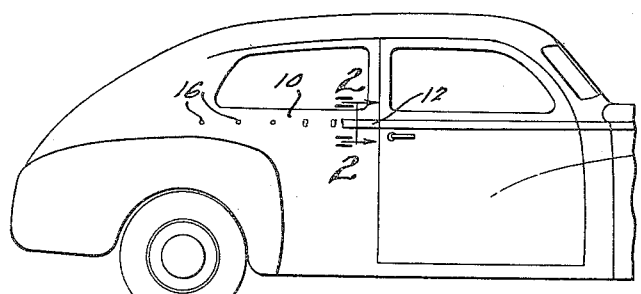
Figure 1 is a fragmentary side-elevational view of a motor vehicle body having an ornamental molding secured by fastening means constructed in accordance with the present invention, a portion of the molding being broken away.
Figure 2:
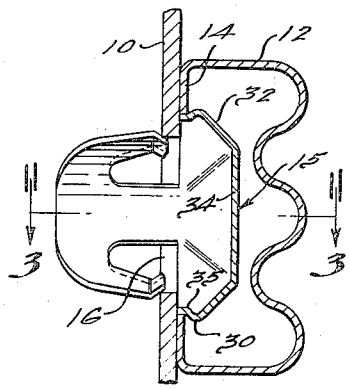
Figure 2 is a sectional elevational view upon a larger scale, taken substantially on the line 2—2 of Figure 1, looking in the direction of the arrows.

Referring now to the drawings, reference character 10 designates a sheet metal automobile body panel which is shown as typifying a support of the class with which my improved fastening clip is adapted to cooperate, to enable the securing of a desired object to such panel. A typical supported object is illustrated in the form of a trim molding 12 formed of an elongated strip of resilient sheet metal, such as stainless steel, of modified channel form. As best shown in Figure 2, the molding may be formed to present an ornamental contour exteriorially and is also provided with a pair of inturned flanges 14 projecting toward one another and defining spaced holding portions adapted to lie flat against the supporting panel 10 and to overengage the head portions, generally designated 15, of coacting supporting clips constructed in accordance with my invention. The clips are adapted to be arranged in appropriately spaced positions, one such clip being mounted in each opening 16 of a series of openings suitably formed in the body panel 10. The head portion of the clip is elongated sufficiently to overlie the panel upon either side of the opening 16 when fitted thereinto in the manner best shown in Figures 2 and 3. The head 15 is of hollow dished form and arranged to open toward the supporting panel 10, the free edges of the head which overlie the body panel being arranged in a common plane and adapted to fit tightly against the outer surface of the panel when the clip is in position.

Figure 5:
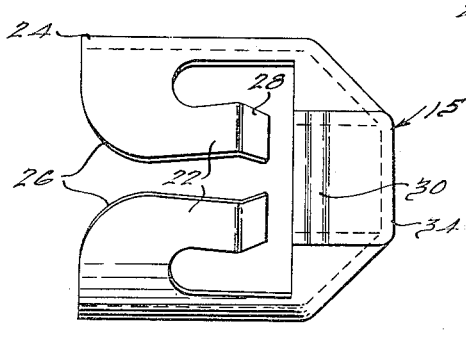
Figure 5 is a bottom plan view thereof.
Figure 3:
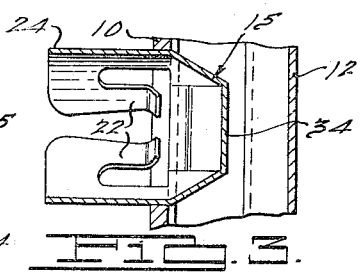

Viewed in plan the head will be seen to taper to reduced width toward its ends which overlie the body panel, while the medial portions of the head are formed to circular cross section as best shown at 18 in Figure 5. The radius of the portions 18 of circular section corresponds closely to the radius of the holes as 16 with which the fastener is designed to cooperate.

Extending downwardly from the central side portions 18 of the head structure are a pair of supporting stem portions which are preferably cross sectionally longitudinally channeled to partly circular form and in such fashion as to be concentric with and form aligned continuations of the partly circular side portions 18 of the head. The stem portions designated 20, 21 extend downward from the head in generally parallel relation and to a distance sufficient to support from their lower extremities a plurality of retrovertly extending spring holding fingers 22, also formed integrally with the head and stem portions. The entire fastener may be formed of hardened spring stock. In the preferred construction shown, each stem portion carries a pair of such spring fingers, one upon either side of the stem, all of the fingers and stem portions being circumferentially spaced and concentric with the partly circular head portions 18 and with the longitudinal axis of the fastener. Each stem is joined to the spring fingers it supports by a peripherally enlarged lower portion 24 which is also concentric and of partly circular section. Each set consisting of one of the supporting stems with its two spring fingers occupies slightly less than 180°, so that the stem portions are flexible toward and from one another.

The free ends of the fingers 22 underlie but terminate short of the bottom of the head 15 and the fingers are individually flexible radially toward and from the axis of the fastener. The fingers diverge gradually from one another in a direction toward the head to a line designated 25, at which line they are bent angularly inwardly toward the axis, and preferably at a sharper angle. At their opposite peripheral ends, the portions 24, where they join the fingers 22, may be rounded as indicated at 26, to facilitate insertion of the fastener in the supporting opening 16.

Figure 3:
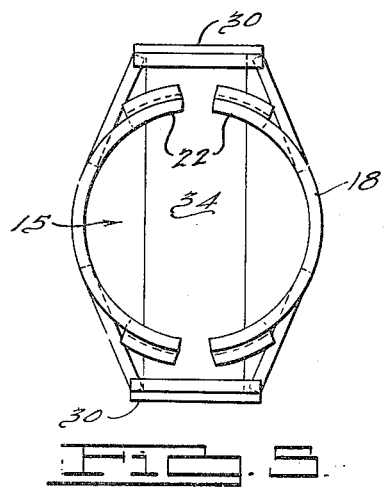
Figure 3 is a cross-sectional view taken substantially on the line 3—3 of Figure 2, and looking in the direction of the arrows.
Figure 4:
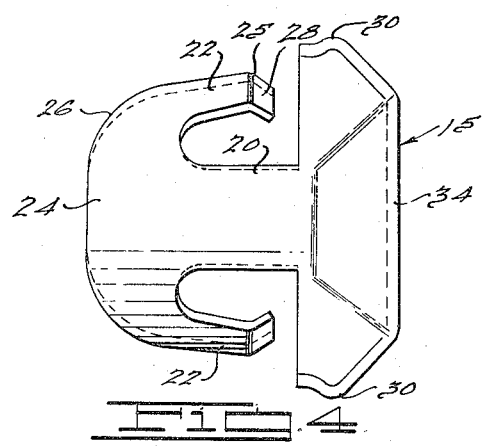
Figure 4 is a side-elevational view of one of my improved clips upon a still larger scale.

The relaxed spacing of the free extremities of the fingers 22, and particularly of the more sharply inclined free ends 28 thereof, is somewhat greater than the maximum diameter of the opening 16 which the fastener is designed to fit, so that when secured in position in the manner illustrated in Figures 2 and 3, the fingers are resiliently pressed and held inwardly and the inclined portions 28 frictionally engage the inner edge of the hole and oppose removal of the fastener. The inclined portions 28 also exert a camming action tending to draw the head 15 inwardly toward and hold it against the outer surface of the supporting panel 10.

The opposite end portions of the head structure are preferably straight and parallel, as best shown in Figure 5, at 30, the portions 30 being designed to extend parallel to the free edges of the internal holding flanges 14 of a supported molding as 12. In the drawing, the reference numerals 30 are applied to the longest portions of the head, defined by the apices of angles, which are defined by outwardly sloping end portions 32 (which extend divergently from the flat top portion 34 of the head towards the ends of the head) and integral inwardly bent extremities 35 which reconverge at a steeper angle toward the axis and constitute the lowest portions of the head at the extremities thereof. The portions 35 define holding portions behind which the holding flanges 14 are adapted to engage so that the molding may be frictionally retained by the head of the fastener. It will also be observed that due to the inherent resiliency of the molding and the inclination of the holding portions 35, which are spaced apart far enough to exert a constant slight spreading effort upon the flanges 14 when the molding is in place, the portions 35 exert a camming action such that the molding constantly urges itself against the supporting panel 10. This action occurs by virtue of the resiliency of the molding itself.

The fasteners are readily applied, simply by pushing or tapping them into place, and due to the gradual slope of the finger portions 22 lying below the line 25, they may be slid into position with relative ease, whereas after full insertion of the fastener, the fingers spring outwardly to the position indicated in Figures 2 and 3 and due to the abrupt angularity of the portions 28, the fingers oppose removal of the fastener much more strongly than they resist insertion thereof.

While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

What is claimed is:

1. A spring fastener comprising a substantially impervious, outwardly crowned concavo-convex head, a plurality of stem portions extending from laterally spaced marginal portions of said head in a direction away from the concave side thereof, and a plurality of resilient holding fingers supported only by parts of said stem portions remote from said head and extending back towards the head and also diverging angularly away from one another and from such stem portions.

2. A spring fastener comprising a substantially impervious, outwardly crowned concavo-convex head, a plurality of stem portions extending from laterally spaced marginal portions of said head in a direction away from the concave side thereof, and a plurality of resilient holding fingers supported only by parts of said stem portions remote from said head and extending back towards the head and also diverging angularly away from one another and from such stem portions, said head being of noncircular form but the fastener being substantially symmetrical with respect to an axis extending longitudinally between the stem portions and through the head, the stem portions being of substantially arcuate cross section close to said head and adapted to lie closely against the edges of a circular opening with which the fastener is interfitted while the head overlies marginal portions of such an opening, whereby said head and stem portions may cooperate to substantially block such an opening.

WILLIAM R. WILEY.

REFERENCES CITED

The following references are of record in the file of this patent:

UNITED STATES PATENTS

| Number | Name | Date |
| --- | --- | --- |
| 2,142,429 | Wiley | Jan. 3, 1939 |
| 2,181,966 | Dean | Dec. 5, 1939 |
| 2,201,335 | Cotter | May 21, 1940 |
| 2,221,124 | Wiley | Nov. 12, 1940 |
| 2,258,788 | Meyer et al. | Oct. 14, 1941 |
| 2,327,329 | Murphy | Aug. 17, 1943 |